March 8, 1966     B. D. TODD ETAL     3,239,195
BRACE FOR WIRE FENCES
Filed Sept. 4, 1962     3 Sheets-Sheet 1
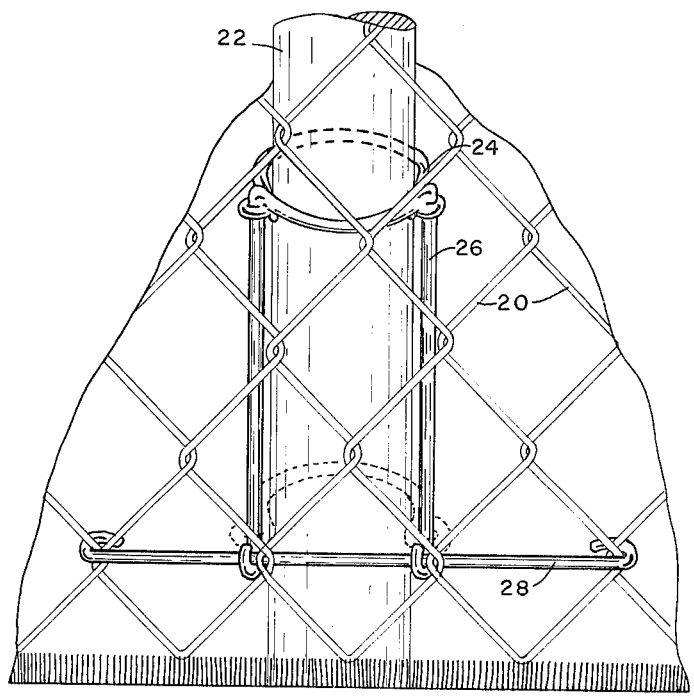
FIG. 1
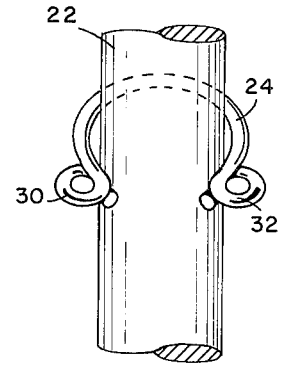
FIG. 2
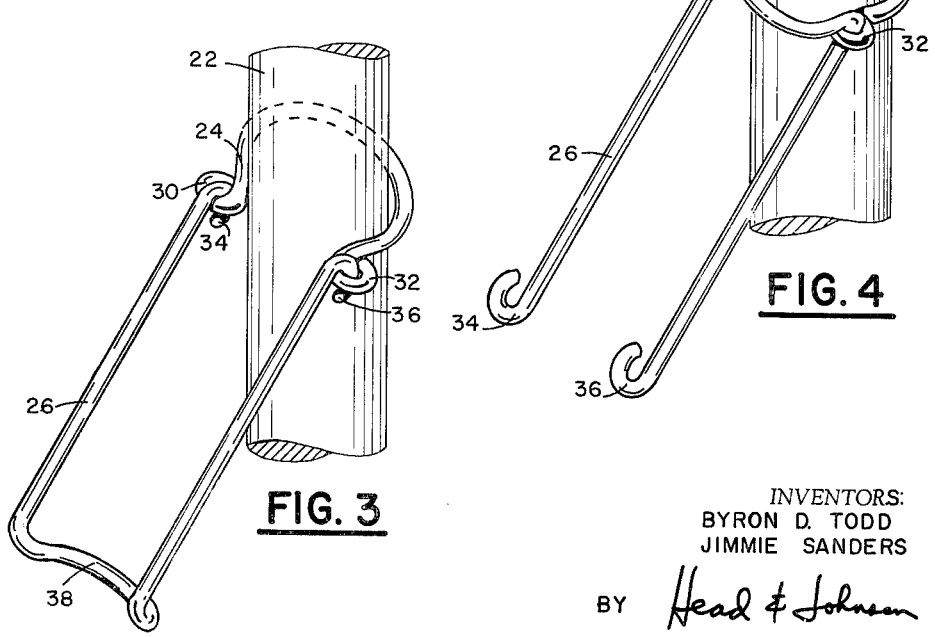
FIG. 3
FIG. 4
INVENTORS:
BYRON D. TODD
JIMMIE SANDERS
BY *Head & Johnson*
ATTORNEYS March 8, 1966  B. D. TODD ETAL  3,239,195
BRACE FOR WIRE FENCES Filed Sept. 4, 1962  3 Sheets-Sheet 2

INVENTORS:
BYRON D. TODD
JIMMIE SANDERS

BY *Head & Johnson*

ATTORNEYS

March 8, 1966  B. D. TODD ETAL  3,239,195
BRACE FOR WIRE FENCES
Filed Sept. 4, 1962  3 Sheets-Sheet 3
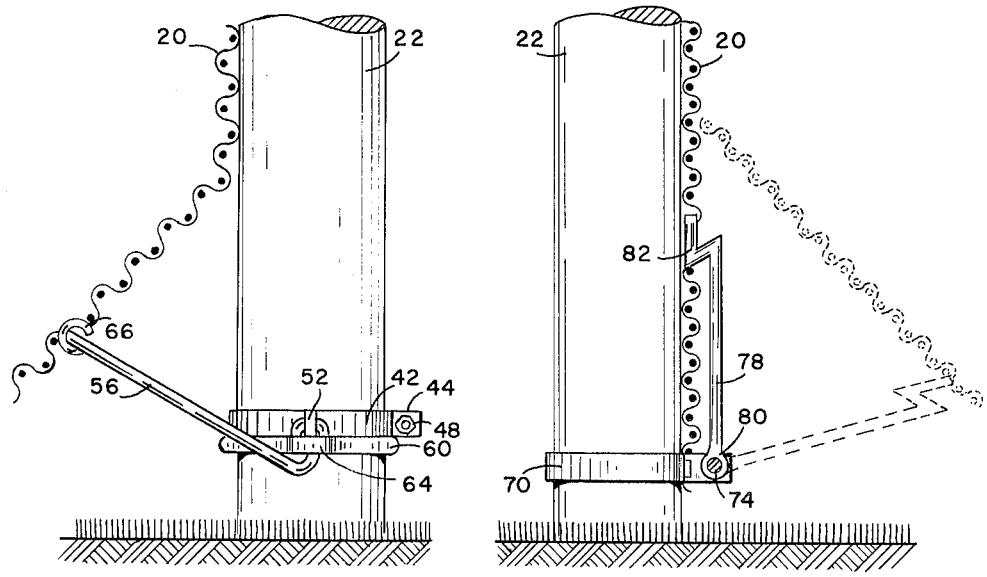
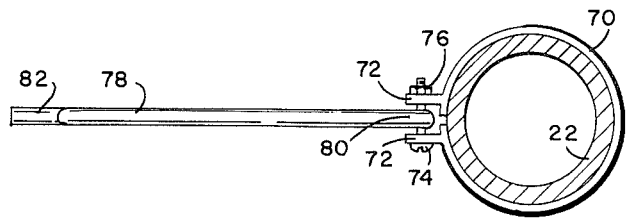
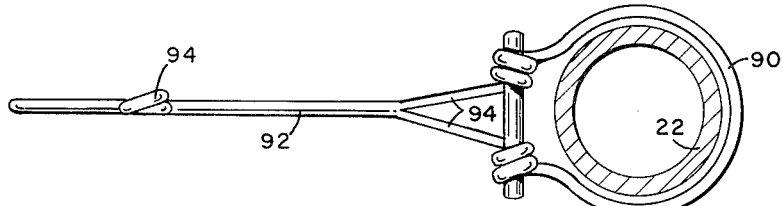
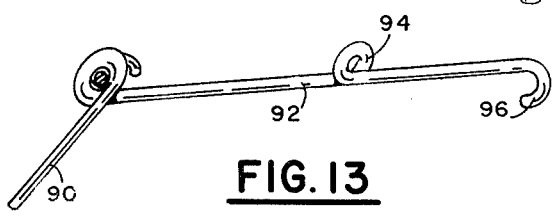
INVENTORS:
BYRON D. TODD
JIMMIE SANDERS
BY Head & Johnson
ATTORNEYS United States Patent Office 3,239,195
Patented Mar. 8, 1966

3,239,195
BRACE FOR WIRE FENCES
Byron D. Todd and Jimmie Sanders, Tulsa, Okla., assignors of one-third to Ronald D. Todd, Tulsa, Okla.
Filed Sept. 4, 1962, Ser. No. 221,009
7 Claims. (Cl. 256—32)

This invention relates to a brace apparatus for actuating the lower edge of wire mesh type fences into an extended position outwardly from the fence row for the purpose of facilitating cutting grass, cleaning the fence row and preventing undue hand trimming.

In wire mesh fences such as the type commonly termed "chain link" the fence is vertically secured to a multiplicity of spaced vertical fence posts. The fence is normally retained to each post in a substantially rigid condition and accordingly it becomes extremely difficult to mow or clip grass or vegetation adjacent the fence rows.

Accordingly, it is an object of this invention to provide an apparatus which is attached to the fence post and the fence and is readily pivotal to a position wherein the bottom of the fence is extended outwardly away from the normal fence row from a position wherein the fence is locked in its normal vertical position.

Another object of this invention is to provide an apparatus which combines relatively simple parts and which can be readily attached to the fence and fence post for actuation into the two positions above described. In that regard the apparatus is adaptable to existing fence structures or can be attached on new fence construction.

It is another object of this invention to provide a device for actuating the lower portion of fences in order to extend them outwardly away from the normal fence row and which is adaptable to various types and sizes of fence posts, whether they be round or rectangular, wood or metal, or otherwise.

These and other objects of this invention will become more apparent upon further reading of the specification and claims when taken in conjunction with the following illustrations of which:

FIGURE 1 is a front elevational view of the assembled apparatus according to this invention.

FIGURES 2, 3 and 4 illustrate the various steps in assembling the apparatus of this invention to fence posts.

FIGURES 8 and 9 illustrate the various operative positions of the embodiment illustrated in FIGURE 7.

FIGURE 10 represents another embodiment of this invention.

FIGURE 11 illustrates the operation and use of the embodiment shown in FIGURE 10 as it applies to this invention.

FIGURES 12 and 13 are top and side elevational views of a yet additional embodiment of this invention incorporating features of the types described in FIGURES 1 through 9.

*General description*

Figure 5:
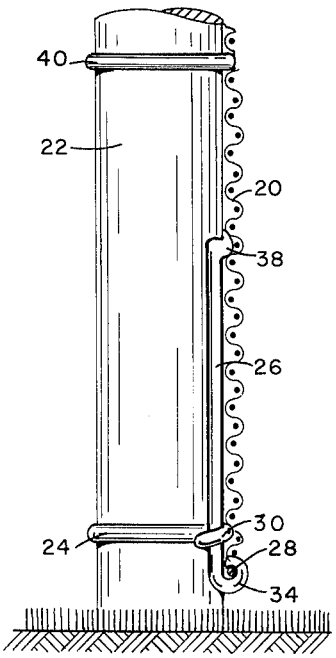
FIGURES 5 and 6 depict the usage of the apparatus of this invention in the normally locked position and extended position respectively.

Broadly speaking, this invention relates to apparatus which is adapted to be connected to and between the bottom of an outwardly movable fence portion and a contiguous fence post or support. The apparatus incorporates portions which are not only pivotally moved to one position extending the fence outwardly from its normal fence row position but which are also used to lock the fence in its normal vertical position and prevent any outward movement. The broad aspects of the invention include a lever brace means positioned between a fence and fence post. The brace is pivotally attached to the fence at one end and is vertically slidable with respect to said post at the other end.

*Detailed description*

Reference is now made to the drawings in detail, where like numerals refer to the same or similar parts throughout.

FIGURE 1 is a frontal elevational view depicting a fence 20, which is typically of the type sold under the trademark "Chain-Link." The fence is typically positioned vertically and supported by a plurality of spaced vertical posts 22. A partially circular bracket or slide locking ring 24 interconnects with pivotal lever brace 26 at one end as shown. The other end of the brace 26 is adapted to be attached, in some manner, to the fence 20. In the embodiment shown, a stiffener rod 28 is attachably secured to the fence 20 and thence to the brace 26 as shown. As shown in the dotted line bracket ring 24 is adapted to be positioned as shown with respect to the brace 26 which locks the fence in its normally vertical position until it is desired to extend the fence outwardly for mowing or otherwise clipping the region adjacent the fence row, and as hereinafter described.

One of the important aspects of this invention resides in the novel manner in which it can be readily assembled for use. This is shown in sequence in FIGURES 2, 3 and 4. As shown, the bracket 24 is partially circular in shape and is positioned about post 22. The bracket ends include loop portions 30 and 32. The lever brace 26 comprises two leg portions closed at one end by the arcuate connecting portion 38. This portion is adapted to configure about the fence post in all positions and for all shapes of posts. Hook type loops 34 and 36 are formed at the ends of the legs which are hooked within the loops 30 and 32 respectively. The brace legs are then pushed through the loops until retarded by the connecting portion 38 as shown in FIGURE 4.

The above described sequence of operations may be performed about the fence post even though the fence is already constructed. That is, the bracket 24 and lever brace 26 can be engaged on the fence post away from the fence and thereafter turned to where the lever is between the fence and the post. Thereafter, the loops 34 and 36 are either clamped about the fence 20 or preferably about a stiffener rod 28 which has been previously affixed to the fence as best shown in FIGURE 1.

Figure 6:
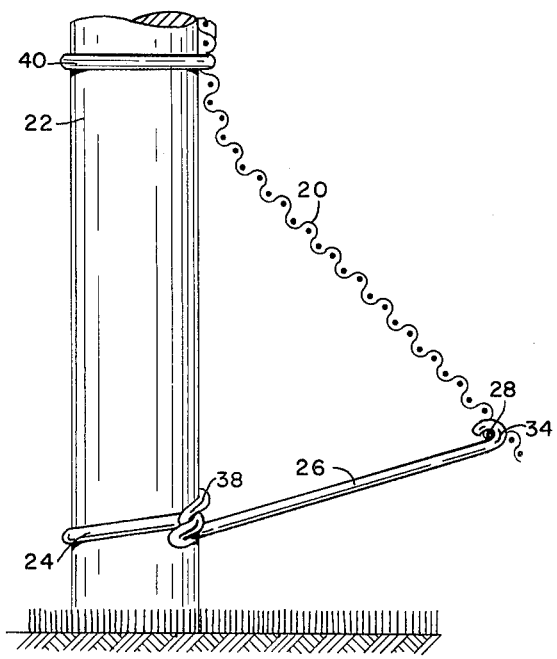

The operation of this embodiment after attachment is best described in FIGURES 5 and 6. In the former, the locked vertical position is shown. Ordinarily, if there are any previously affixed tie wires such as depicted by the numeral 40, these are removed from the lower portion of the fence and post and the apparatus of this invention is thereby substituted for such a clamp. In that position, the lever brace 26 is in a substantially vertical position with the semi-circular portion 38 arcuately conformed co-axially to the post 22 so as to permit the fence to rest substantially vertically against the post in a normal manner. Bracket ring 24 is slideably lowered about the post 22 and the lever brace legs to a position shown and hence locks the apparatus in that position and prevents any movement of the apparatus. When it is desired to extend the fence outwardly, the bracket ring 24 is normally raised until loops 30 and 32 interengage with the arcuate portion 38. Thence the interengaged portions are longitudinally moved downward about the post 22 while at the same time pushing the lower part of fence 20 outwardly until a position is reached as shown in FIGURE 6 wherein brace 26 is in a substantially horizontal position, if not slightly off-dead-center, wherein the normal spring restraining force of the fence would prevent the bracket ring 24 and brace 26 from reverting back to the previous position.

Figure 7:
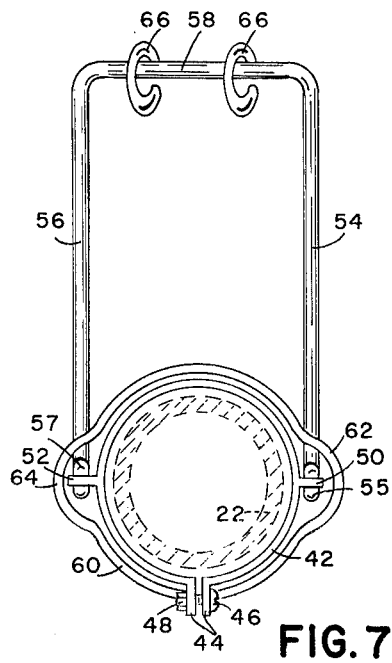
FIGURE 7 is a top elevation view of another embodiment of this invention.
Figure 8:
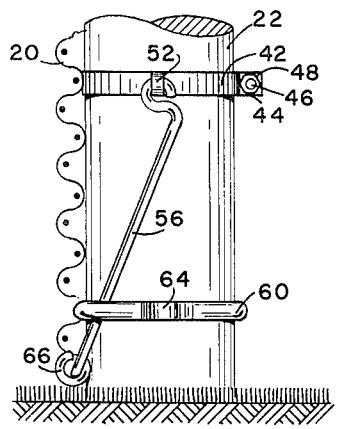

FIGURES 7, 8 and 9 represent an alternate embodiment of this invention. A bracket ring 42 is of the type adaptable to be loosely strapped about post 22 such as by using abutting ears or flanges 44 which are retained together by threaded bolt 46 and nut 48. The ring includes ear extension portions 50 and 52, which are diametrically opposite each other, and which are adapted to receive pivotal lever brace arms 54 and 56 respectively by means of interlocked eyelets 55 and 57. Preferably, in this embodiment, the ends of arms 54 and 56 are connected by portion 58 which is adapted to be attachable to the fence 20 as for example by using rings 66. A separate locking ring 60 is adapted to slide about post 22 and arms 54 and 56, and further includes outward enlarged portion 62 and 64 which, when the ring is in its uppermost position abutting the bracket 42, permits arms 54 and 56 to be moved outwardly, and hence the fence to be moved outwardly from the fence row.

The operation and use of this embodiment is similar to that previously described and is best depicted in FIGURES 8 and 9. In the former, the lock ring 60 is pushed downwardly over the lever brace arms 54 and 56 to retain the fence in its substantially vertical position. When it is desired to move the fence outward away from the fence row, the locking ring is moved upwardly into close engagement with bracket ring 42. By a combination movement of the bracket ring and locking ring downwardly the fence moves outwardly until the position as shown in FIGURE 9 is reached where, again, the lever brace arms are in a relatively off-center position permitting the spring bias force of the fence 20 to maintain the apparatus in a relatively locked position. Although, in some instances, it is helpful to have the operator simultaneously move the fence outward while moving the apparatus, this is not altogether necessary, as it is possible to move the bracket ring and lever brace alone, which forces the fence outward or to the normal vertical position.

The apparatus described in FIGURES 10 and 11 illustrates an even further embodiment of this invention wherein a clamp type bracket 70 is rigidly affixed about post 22 by clamping extensions 72 together using threaded bolt 74 and nut 76. Typically, the bracket is positioned adjacent the ground surface and is adapted with a bracket member 78 which is pivotal about the bolt 74 by an eyelet portion 80. The outer end of the link 78 is adapted with a zig-zag design 82. The apparatus is positioned upon the fence post such as to be rigidly clamped thereto and in such a manner that the bracket or link 78 extends through and outside the fence normally and can be interlocked or intertwined within the fence construction and hence hold the bottom of the fence against the post. When it is desired to mow or clip along the fence row and the bottom portion of the fence is to be moved outwardly away therefrom, the zig-zag linkage portion is then unhooked and the fence manually extended until engagement of the fence linkages is made with the zig-zag portion as shown in the dotted lines of FIGURE 11.

Reference is now made to FIGURES 12 and 13 of a yet additional embodiment. Here, a bracket ring 90 is positionable about a post, not shown, similarly to that described in FIGURE 2. A lever brace member 92 includes a Y-shaped portion 94 which is pivotally attachable to the looped open ends of ring 90, as shown. The lever includes an eyelet portion 94 adjacent the lower end, which is attachable to the fence, as hereinbefore described. The free end of lever brace member 92 includes hook portion 96 which opens away from the fence and towards the post. The hook portion can open towards the fence if desired. This hook serves as a means to permit a ring, surrounding the lower part of a post, to be moved and engaged within the hook and thus retain the device and the fence in its normal position. Otherwise the device operates similar to those devices wherein a pivoting action occurs by sliding the bracket ring downward causing the link to move outward until a substantially horizontal position is reached.

The apparatus of this invention is preferably composed of heavy gage steel rod or wire preformed to the desired shape involved with protective coatings as desired. It is possible that a high strength synthetic resin material could also be utilized for the various parts.

The invention has been described by reference to specific and preferred embodiments. It will be apparent, however, that other modifications can be made without departing from the spirit and scope of the invention. For example, it is possible to incorporate a longitudinal groove to the fence post, within which a lever brace of the type depicted by the numerals 26, 54, 56 and 92 is interlockingly and slideably attached, and hence omit the slide locking ring. Means is provided within the groove design to lock the fence in the two operative positions. Accordingly, this invention should not be construed to be limited to the embodiment herein described, but should be limited only by the scope of the appended claims.

What is claimed is:
1. An actuator and brace for a fence comprising,
   a partial circular bracket the outward ends of which terminate as spaced eyelets,
   a lever brace including spaced parallel legs, an outwardly and downwardly arcuately shaped portion connecting one end of said legs, and means to pivotally connect the other end of said legs to said fence, and
   said brace legs slidable within said eyelets between said one end to said other end, and said brace pivotal therein at said one end from a substantially vertical position to a substantially horizontal position.

2. An actuator and brace for a fence and support post comprising,
   a bracket adaptable to be longitudinally slideable about said fence support post,
   diametrically opposite outwardly extending ears on said bracket,
   a lever brace having parallel legs one end of which pivotally connects with said ears, the other end of which includes means to pivotally connect with said fence, and
   a locking ring longitudinally slideable about said post and said legs to retain said fence parallel to said post in one position and permit said pivotal movement of said brace, bracket and fence to a second position outward from said parallel position.

3. A fence construction of at least one fence post, and a wire mesh relatively flexible fence vertically positioned on said post, in combination comprising,
   a lever brace between said fence and said post at the lower end thereof, said brace actuatable between a first vertical position wherein said fence is vertical and a second substantially horizontal position wherein the lower end of said fence is outward from said post,
   said brace comprising substantially parallel leg portions interconnected at one end by a portion conformable about said post in both said first and second positions, said other end pivotally attached to said fence, and
   a bracket partially surrounding said post, the ends of said bracket forming substantially horizontal eyelets about said leg portions, said bracket vertically slideable with respect to said leg portions and said post to lock said fence in said first position and vertically slideable with said brace to pivot and lock said brace in said second position.

4. A fence construction of at least one fence post, and a wire mesh relatively flexible fence vertically positioned on said post in combination comprising,
- a bracket surrounding said post and vertically slideable thereabout, and
- a lever brace straddling said post and articulately attached at one end to said bracket, and to the lower part of said fence at the other end whereby lowering movement of said bracket forces said brace outward to a substantially horizontal position.

5. A fence construction of at least one fence post and a wire mesh relatively flexible fence vertically positioned on said post in combination, comprising,
- a bracket affixed to said post adjacent the lower end thereof,
- a longitudinal lever brace articulately attached at one end to said bracket about an axis substantially outwardly of said fence and said post, the opposite end of said brace extending through and interlockable with said fence to retain said fence in said vertical position and releasable therefrom and interlockable with said fence when said lower end of said fence is outward from said post.

6. A fence construction of at least one fence post and a wire mesh relatively flexible fence vertically positioned on said post, in combination comprising:
- a bracket surrounding said post and vertically slidable thereabout;
- a lever brace straddling said post and articulately attached at one end to said bracket and to the lower part of said fence at the other end whereby lowering movement of said bracket forces said brace outwardly to a substantially horizontal position; and
- a locking ring slidable about said brace and post to lock said fence vertically in one position and to a second position to permit the relative movement of said brace and bracket.

7. A fence construction of at least one fence post and a wire mesh fence vertically positioned on said post, in combination comprising:
- a lever brace positionable between said fence and said post at the lower end thereof, said brace actuatable between a first substantially vertical position wherein said fence is vertical and a second substantially horizontal position wherein the lower end of said fence is outward from said post, said brace comprising one end supported about and vertically slidable with respect to said post and the other end pivotally attached to said fence; and
- a ring vertically slidable about said post and said brace to lock said fence vertically in one position and to a second position to permit relative movement of said brace.

References Cited by the Examiner

UNITED STATES PATENTS 2,814,466  11/1957  Golobay _____ 256—32

FOREIGN PATENTS 164,627  7/1904  Germany.

REINALDO P. MACHADO, *Primary Examiner.*

HARRISON R. MOSELEY, *Examiner.*